United States Patent
Lee et al.

(10) Patent No.: US 10,766,794 B2
(45) Date of Patent: Sep. 8, 2020

(54) RESOURCE RECOVERY METHOD USING DESALINATION WATER TREATMENT APPARATUS

(71) Applicant: Kookmin University Industry Academy Cooperation Foundation, Seoul (KR)

(72) Inventors: Sang-Ho Lee, Seoul (KR); Jin-Sik Sohn, Seongnam-si (KR); Yong-Jun Choi, Goyang-si (KR); Ji-Hyeok Choi, Seoul (KR); Yong-Hyun Shin, Uijeongbu-si (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 91 days.

(21) Appl. No.: 16/250,079

(22) Filed: Jan. 17, 2019

(65) Prior Publication Data

US 2019/0144309 A1    May 16, 2019

Related U.S. Application Data

(62) Division of application No. 15/488,817, filed on Apr. 17, 2017, now Pat. No. 10,239,770.

(30) Foreign Application Priority Data

Apr. 29, 2016 (KR) .................. 10-2016-0053058
Jun. 22, 2016 (KR) .................. 10-2016-0078113
Mar. 23, 2017 (KR) .................. 10-2017-0036694

(51) Int. Cl.
*C02F 1/44* (2006.01)
*B01D 61/36* (2006.01)
(Continued)

(52) U.S. Cl.
CPC ............ *C02F 1/447* (2013.01); *B01D 9/0063* (2013.01); *B01D 9/0081* (2013.01);
(Continued)

(58) Field of Classification Search
None
See application file for complete search history.

(56) References Cited

U.S. PATENT DOCUMENTS 4,875,980 A * 10/1989 Arita .................... B01D 61/362
                                                    203/14
4,879,041 A * 11/1989 Kurokawa .............. C02F 1/045
                                                    210/640
(Continued)

FOREIGN PATENT DOCUMENTS

JP          05-057300 A      3/1993
KR    10-2004-0020053 A      3/2004
(Continued)

OTHER PUBLICATIONS

Chan Mya Tun, et al., "Membrane distillation crystallization of concentrated salts—flux and crystal formation", Journal of Membrane Science, May 19, 2004, pp. 144-155.
(Continued)

*Primary Examiner* — Krishnan S Menon
(74) *Attorney, Agent, or Firm* — Paratus Law Group, PLLC

(57) ABSTRACT

A resource recovery method includes: feeding raw water to a first-stage raw water tank; supplying high-temperature vapor to a first-stage heat exchanger; performing heat exchange between the supplied high-temperature vapor and the raw water in the first-stage raw water tank, changing a portion of the water into vapor and supplying the changed vapor to a subsequent-stage heat exchanger; repeatedly performing the performing step for each of the raw water (Continued)

tanks sequentially in the order from a second state to a n-th stage; being feed to a crystallizer from the n-th stage raw water tank; detecting a turbidity of the raw water fed to the crystallizer from the n-th-stage raw water tank; and extracting crystals of valuable resources contained in the raw water fed to the crystallizer from the n-th-stage raw water tank when the turbidity of the raw water becomes a predetermined value.

5 Claims, 5 Drawing Sheets

(51) Int. Cl.
*B01D 9/00* (2006.01)
*C02F 1/52* (2006.01)
*C02F 1/00* (2006.01)

(52) U.S. Cl.
CPC ......... *B01D 61/364* (2013.01); *B01D 61/366* (2013.01); *B01D 2009/0086* (2013.01); *B01D 2311/25* (2013.01); *B01D 2311/26* (2013.01); *B01D 2315/06* (2013.01); *B01D 2317/02* (2013.01); *C02F 1/001* (2013.01); *C02F 2001/5218* (2013.01); *C02F 2209/005* (2013.01); *C02F 2209/02* (2013.01); *C02F 2209/03* (2013.01); *C02F 2209/105* (2013.01); *C02F 2209/11* (2013.01)

(56) References Cited

U.S. PATENT DOCUMENTS

| | | | | |
|---|---|---|---|---|
| 5,556,539 A | * | 9/1996 | Mita | B01D 61/362 210/195.2 |
| 6,306,307 B1 | * | 10/2001 | McGregor | B01D 53/22 202/176 |
| 6,586,638 B1 | * | 7/2003 | Zhang | B01D 61/246 210/500.21 |
| 6,716,355 B1 | * | 4/2004 | Hanemaaijer | B01D 61/364 210/640 |
| 8,685,252 B2 | * | 4/2014 | Vuong | B01D 61/04 210/321.7 |
| 2010/0072130 A1 | * | 3/2010 | Fane | B01D 61/364 210/605 |
| 2011/0259822 A1 | | 10/2011 | Al-Jlil | |
| 2016/0038879 A1 | | 2/2016 | Yamaguchi et al. | |
| 2016/0310900 A1 | | 10/2016 | Francis et al. | |
| 2017/0028348 A1 | * | 2/2017 | Hancock | C02F 1/445 |
| 2018/0118585 A1 | * | 5/2018 | Chidambaran | B01D 61/366 |
| 2019/0023585 A1 | * | 1/2019 | Chai | C02F 1/001 |

FOREIGN PATENT DOCUMENTS

| | | |
|---|---|---|
| KR | 10-1401211 B1 | 6/2014 |
| KR | 10-2014-0101589 A | 8/2014 |
| KR | 10-1508852 B1 | 4/2015 |
| KR | 10-1556915 B1 | 10/2015 |
| KR | 10-2015-0137167 A | 12/2015 |
| KR | 10-1605535 B1 | 4/2016 |
| WO | WO 2006/137808 A1 | 12/2006 |

OTHER PUBLICATIONS

Korean Office Action for related KR Application No. 10-2016-0078113 dated Jul. 27, 2017 from Korean Intellectual Property Office.

Korean Office Action for related KR Application No. 10-2016-0053058 dated Oct. 2, 2017 from Korean Intellectual Property Office.

Korean Office Action for related KR Application No. 10-2017-0036694 dated Dec. 1, 2017 from Korean Intellectual Property Office.

* cited by examiner

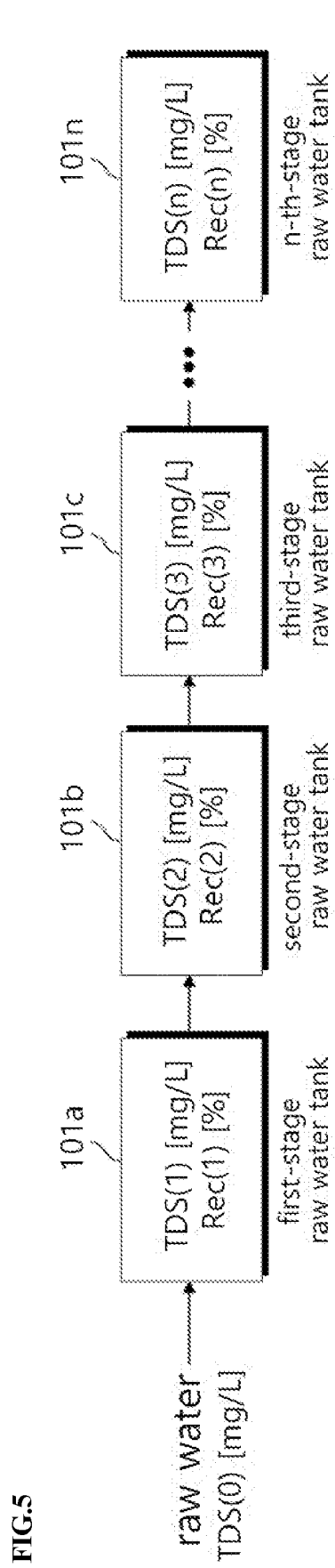

RESOURCE RECOVERY METHOD USING DESALINATION WATER TREATMENT APPARATUS

CROSS REFERENCE TO RELATED APPLICATIONS

This application is a Divisional Application of a U.S. patent application Ser. No. 15/488,817 filed on Apr. 17, 2017, which claims priority to Korean Patent Application Nos. 10-2016-0053058 filed on Apr. 29, 2016, 10-2016-0078113 filed on Jun. 22, 2016, and 10-2017-0036694 filed on Mar. 23, 2017, which are all hereby incorporated by reference in their entirety.

BACKGROUND

The present invention relates to a resource recovery method. More particularly, the present invention relates to a resource recovery method using a multi-stage submerged membrane distillation water treatment apparatus including a series of raw water tanks arranged in multiple stages, each tank storing raw water and provided with a membrane distillation (MD) module and a heat exchanger submerged in the raw water, the apparatus being configured such that vapor discharged from a membrane distillation module at a certain stage is used for heat exchange by a heat exchanger at the following stage, whereby the apparatus dramatically reduces consumption of energy required for heating of the raw water and recovers resources contained in the raw water.

According to a 2009 World Economic Forum Water Resource Initiative report, the world water demand increased three-fold from 1950 to 1990, which was an increase rate greatly higher than an increase rate of the world population. It was also noted that water demand is expected to increase two-fold within the next 35 years. In addition, the current active production of alternative energy resources such as hydrogen gas and bioethanol, will further increase water demand.

To address water shortages, recycling and reuse of sewage or waste water have recently been actively studied. However, in fact, a water reuse rate is currently actually very low, or usage of recycled water is very limited due to concerns about the quality of the recycle water. For example, recycled water is largely used as cleaning water in sewage and waste water treatment facilities, or as cooling water or diluting water.

To solve this problem, various technologies are now being used in water treatment or reuse sites. For example, membrane distillation (MD), which is a water treatment technology of separating water in the form of pure vapor from raw water using a hydrophobic porous membrane, is used.

In a membrane distillation process, raw water comes into contact with the surface of a membrane but cannot permeate into the pores of the membrane due to high surface tension attributable to the highly hydrophobic surface of the membrane, and only vapor passes through the pores of the membrane and is collected as fresh water.

The cause of mass transfer in a membrane distillation process is due to a temperature difference between high-temperature raw water and low-temperature filtrate divided by a separation membrane. A vapor pressure difference triggered by the temperature difference is the driving force of causing the vapor, changed from liquid phase water, to move from the raw water side to the filtrate side.

Membrane distillation methods are classified into four categories according to technologies applied to the filtrate side to generate a vapor pressure gradient serving as the driving force: direct contact membrane distillation (DCMD); air gap membrane distillation (AGMD); sweep gas membrane distillation (SGMD); and vacuum membrane distillation (VMD).

Membrane distillation methods treat raw water based on phase change. The methods have many advantages: approximately 100% of removal rate of nonvolatile contaminants; lower operation pressures compared to reverse osmosis; and simple pretreatment equipment and facilities due to its high resistance to membrane contamination.

However, despite of these advantages, the methods also have a disadvantage that they require high energy consumption to heat raw water to a predetermined temperature (typically 60 to 80° C.) to generate a vapor pressure difference serving as the driving force of mass transfer. In addition, energy is further consumed to condense the vapor having passed through a membrane distillation module.

In addition, conventional membrane distillation methods have difficulty in removing contaminants from sewage or waste water in which highly concentrated salts (i.e. valuable resources) are contained, and are thus poor at producing quality fresh water. Furthermore, conventional membrane distillation methods cannot recover or recycle valuable resources contained in high concentration, and thus the valuable resources are chemically treated and collected as sludge. As a result, a large amount of chemicals is necessarily used and correspondingly a large amount of sludge is generated, which results in an increase in sludge treatment costs.

For these reasons, development of a technology of improving energy efficiency and efficiently recovering valuable resources contained in raw water in a membrane distillation process is required.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent Application Publication No. 2014-0101589
(Patent Document 2) Korean Patent No. 1556915
(Patent Document 3) Korean Patent No. 1605535

SUMMARY

Accordingly, the present invention has been made in view of the problems occurring in the related arts, and an object of the present invention is to provide a resource recovery method using a multi-stage submerged membrane distillation water treatment apparatus including a series of raw water tanks arranged in multiple stages, the method removing contaminants and high concentrations of salts contained in raw water through a multi-stage membrane distillation water treatment process, thereby producing quality fresh water and recovering valuable resources contained in raw water while circulating raw water.

In order to accomplish the objects of the present invention, according to one aspect, there is provided a multi-stage submerged membrane distillation water treatment apparatus including: a plurality of raw water tanks arranged in multiple stages ranging from a first stage to an n-th stage and storing raw water, the raw water sequentially flowing from the first stage to the n-th stage; a plurality of membrane distillation (MD) modules arranged in multiple stages and submerged in the raw water in the respective raw water tanks, the MD modules discharging a portion of the raw water as vapor; a plurality of heat exchangers arranged in multiple stages and submerged in the raw water in the respective raw water tanks, each heat exchanger performing heat exchange using the vapor supplied from a previous-stage MD module of the MD modules, thereby maintaining the raw water in the corresponding raw water tank at a predetermined temperature; a vapor generator generating high-temperature vapor and supplying the high-temperature vapor to the first-stage heat exchanger; a condenser condensing the vapor supplied from the n-th-stage MD module through heat exchange, and discharging filtrate resulting from the condensation; and a raw water feeder feeding low-temperature raw water to the first-stage raw water tank via the condenser such that the row-temperature raw water is used for heat exchange in the condenser before being fed to the first-stage raw water tank.

The vapor generator may supply vapor having a temperature higher than that of the raw water in the first-stage raw water tank to the first-stage heat exchanger, and vapor that is discharged by the first-stage heat exchanger may be returned to the vapor generator.

The multi-stage submerged membrane distillation water treatment apparatus may further include a filtrate tank storing vapor discharged by the heat exchangers at the second to n-th stages and vapor discharged by the condenser.

The multi-stage submerged membrane distillation water treatment apparatus may further include: a temperature detector detecting a temperature of the raw water in the first-stage raw water tank; and a vapor temperature controller controlling a temperature of the vapor generated by the vapor generator in accordance with the temperature of the raw water detected by the temperature detector.

The multi-stage submerged membrane distillation water treatment apparatus may further include a plurality of aerators arranged in multiple stages and submerged in the respective raw water tanks, the aerators performing aeration continuously or periodically.

According to another aspect, there is provided a multi-stage submerged membrane distillation water treatment apparatus including: a plurality of raw water tanks arranged in multiple stages ranging from a first stage to an n-th stage to store raw water, and configured such that the raw water sequentially flows from the first stage (foremost stage) to the n-th stage (last stage); a plurality of membrane distillation (MD) modules arranged in multiple stages and submerged in the respective raw water tanks, the MD modules discharging a portion of raw water as vapor; a plurality of heat exchangers arranged in multiple stages and submerged in the respective raw water tanks, each heat exchanger performing heat exchange using the vapor supplied from a previous-stage MD module of the MD modules, thereby enabling the raw water in the corresponding raw water tank to be maintained at a predetermined temperature; a vapor generator generating high-temperature vapor and supplying the generated high-temperature vapor to the heat exchanger in the first-stage raw water tank; a crystallizer receiving raw water discharged from the n-th-stage raw water tank and extracting crystals of valuable resources contained in the raw water; a turbidimeter detecting a turbidity of the raw water supplied to the crystallizer from the n-th-stage raw water tank; and a controller controlling operation of the crystallizer such that crystals of valuable resources in the raw water are collected when a turbidity detected by the turbidimeter is equal to a predetermined reference value.

The crystallizer may selectively feed the raw water from which the crystals are removed to at least one raw water tank among the raw water tanks at the first to n-th stages.

The multi-stage submerged membrane distillation water treatment apparatus may further include: a condenser condensing vapor supplied from the MD module in the n-th-stage raw water tank through heat exchange and discharging resultant condensate outside the condenser; and a raw water feeder feeding low-temperature raw water to the first-stage raw water tank via the condenser such that the low-temperature raw water undergoes heat exchange in the condenser before being fed to the first-stage raw water tank.

The vapor generator may supply vapor having a temperature higher than that of the raw water in the first-stage raw water tank to the first-stage heat exchanger, and vapor that is used for heat exchange by the first-stage heat exchanger and then discharged by the first-stage heat exchanger may be returned to the vapor generator.

The multi-stage submerged membrane distillation water treatment apparatus may further include a filtrate tank storing vapor discharged from the heat exchangers at the second to n-th stages after undergoing heat exchange, and vapor discharged from the condenser.

The multi-stage submerged membrane distillation water treatment apparatus may further include: a temperature detector detecting a temperature of the raw water in the first-stage raw water tank; and a vapor temperature controller controlling a temperature of the vapor generated by the vapor generator on the basis of the temperature of the raw water detected by the temperature detector.

The crystallizer may include: a housing receiving and storing raw water passing through the n-th-stage MD module; a filter installed in the housing and filtering out crystals of predetermined valuable resources contained in the raw water; a ultrasonic generator generating a predetermined frequency of ultrasonic waves; and at least one ultrasonic vibrator attached to a portion of the housing to vibrate the housing using the ultrasonic waves generated by the ultrasonic generator.

The controller may operate the ultrasonic generator when the turbidity of raw water detected by the turbidimeter becomes the predetermined reference value, thereby vibrating the housing, transferring the vibration of the housing to the filter, and consequently separating crystals of valuable resources attached to the filter from the filter.

The crystallizer may further include a particle analyzer analyzing a particle size of the valuable resources discharged outside the housing, in which the controller transmits a control signal for adjusting a frequency of ultrasonic waves generated by the ultrasonic generator on the basis of the particle size of the valuable resources analyzed by the particle analyzer, to the ultrasonic generator.

The crystallizer may further include a pressure gauge detecting an internal pressure of the housing, wherein the controller operates the crystallizer to separate and remove the crystals of valuable resources from the filter when the internal pressure of the housing reaches a predetermined critical pressure.

According to a further aspect, there is provided a resource recovery method using a multi-stage submerged membrane distillation water treatment apparatus including: a plurality of membrane distillation (MD) modules arranged in multiple stages and submerged in raw water in a plurality of raw water tanks arranged in multiple stages ranging from a first stage to an n-th stage, the MD modules discharging a portion of the raw water as vapor; and a plurality of heat exchangers arranged in multiple stages, each heat exchanger performing heat exchange using the vapor supplied from a previous-stage MD module of the MD modules, thereby maintaining the raw water in each raw water tank at a predetermined temperature, the method comprising: a first step at which a raw water feeder feeds raw water to the first-stage raw water tank; a second step at which a vapor generator supplies high-temperature vapor to the first-stage heat exchanger; a third step at which the first stage heat exchanger performs heat exchange between the supplied high-temperature vapor and the raw water in the first-stage raw water tank, and the first-stage MD module changes a portion of the water into vapor and supplying the changed vapor to a subsequent-stage heat exchanger (second-stage heat exchanger); a fourth step of repeatedly performing the third step for each of the raw water tanks sequentially in the order from the second state to the n-th stage; a fifth step at which the raw water is feed to a crystallizer from the n-th stage raw water tank; a sixth step at which a turbidimeter detects a turbidity of the raw water fed to the crystallizer from the n-th-stage raw water tank; a seventh step at which a controller transits an operation signal to the crystallizer when the turbidity of the raw water detected by the turbidimeter becomes a predetermined reference value; and an eighth step at which the crystallizer operated by the operation signal extracts crystals of valuable resources contained in the raw water fed to the crystallizer from the n-th-stage raw water tank.

The eighth step may include: a first sub-step at which a ultrasonic vibrator generates a predetermined frequency of ultrasonic waves in response to the operation signal transmitted from the controller; a second sub-step at which a ultrasonic vibrator attached to a portion of a housing storing raw water supplied from the n-th-stage raw water tank, vibrates the housing using the ultrasonic waves generated by the ultrasonic generator; and a third sub-step at which a filter installed in the housing is vibrated by vibration of the housing such that crystals of valuable resources, attached to the filter, are separated from the filter.

After the third sub-step is performed, the following steps are further performed: analyzing particle sizes of the crystals of valuable resources filtered out by the filter using a particle analyzer; and transmitting a control signal for adjusting the frequency of ultrasonic waves generated by the ultrasonic generator in accordance with the particle sizes of the crystals of valuable resources analyzed by the particle analyzer, to the ultrasonic generator.

After the first step, the following steps may be further performed: detecting a temperature of the raw water in the first-stage raw water tank, using a temperature detector; and controlling a temperature of vapor generated by a vapor generator on the basis of the detected temperature of the raw water.

After the sixth step, the following steps may be further performed: detecting a conductivity of raw water fed to the crystallizer from the n-th-stage raw water tank, using a conductivity meter; and transmitting an operation signal to the crystallizer by the controller when the detected turbidity and the detected conductivity reach respective reference values.

According to the present invention, the MD modules are submerged in the respective raw water tanks, connected in series, and arranged in multiple stages. Therefore, latent energy of vapor discharged from a previous-stage MD module is used to heat raw water at the following stage. In addition, the vapor generated from the last-stage raw water tank is used to heat raw water to be introduced to the first-stage raw water tank. Therefore, the apparatus of the present invention can dramatically increase heat efficiency compared with conventional membrane distillation apparatuses.

In addition, according to the present invention, since the raw water in each raw water tank is maintained at a constant temperature, high-temperature vapor can be produced. In addition, since latent energy of the high-temperature vapor is recycled, energy consumption can be dramatically reduced.

In addition, according to the present invention, since the membrane distillation water treatment apparatus is operated by only electric energy, the apparatus has a simple structure and can be easily maintained.

In addition, according to the present invention, since the aerators are submerged in the respective raw water tanks arranged in multiple stages and continuously or periodically operated, contamination of the membrane distillation modules can be reduced.

In addition, according to the present invention, since valuable resources, conventionally regarded as waste, contained in raw water can be recovered and recycled, it is possible to secure resources. Furthermore, it is possible to reduce usage of chemicals for recovery of valuable resources and reduce generation of sludge.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a block diagram of an experiment for estimating a total dissolved solids (TDS) level and a recovery rate for each-stage raw water tank.

DETAILED DESCRIPTION

Figure 1:
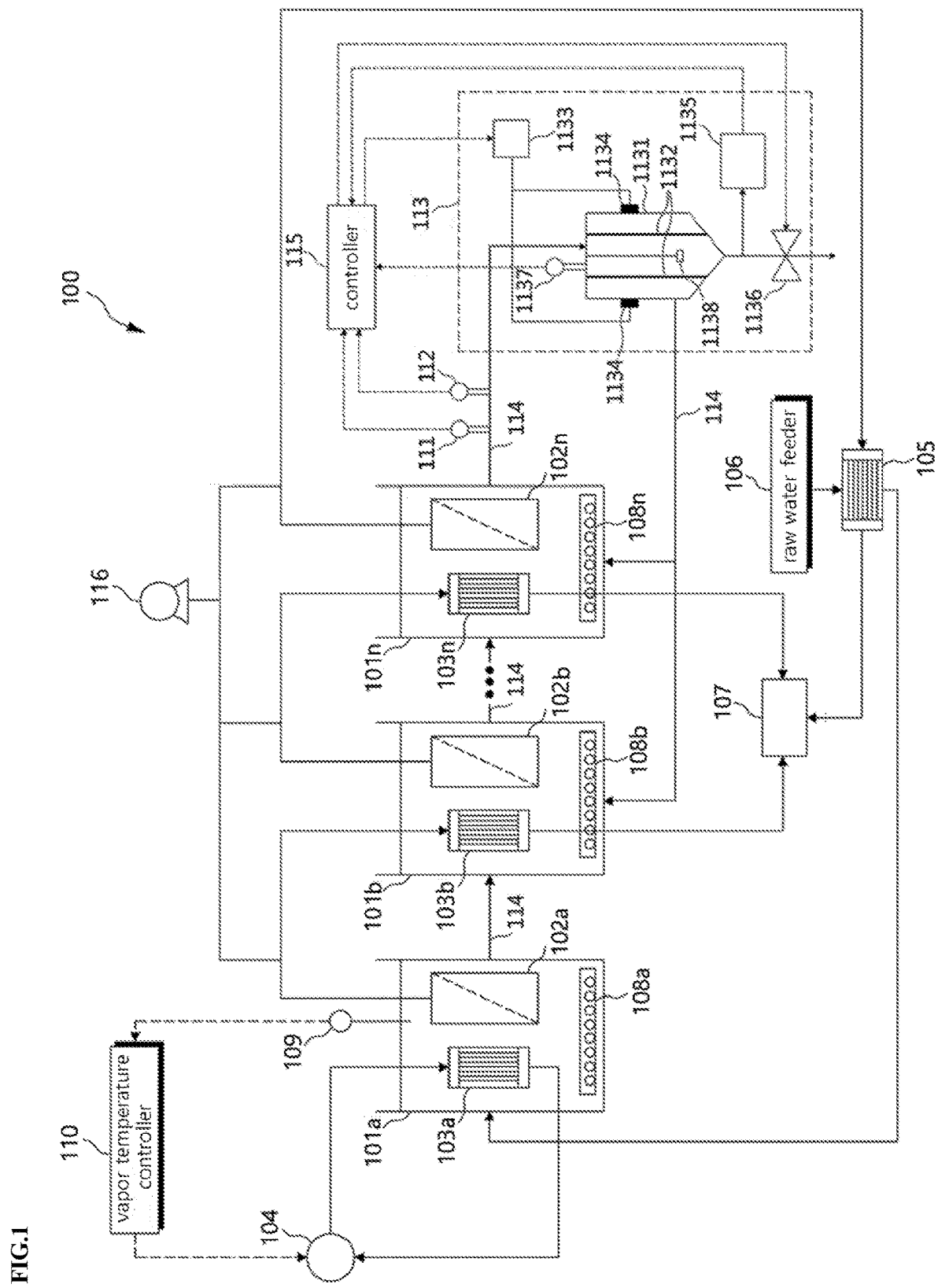
FIG. 1 is a block diagram of a multi-stage submerged membrane distillation water treatment apparatus according to one embodiment of the present invention.

Hereinafter, exemplary embodiments of the present invention will be described with reference to the accompanying drawings. The same reference numerals throughout the drawings denote elements having the same or similar function. In the following description of embodiments of the present invention, detailed descriptions of known functions and components incorporated herein will be omitted when it may make the subject matter of the present invention unclear.

It will be understood that, although the terms first, second, A, B, (a), (b) etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. In addition, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

FIG. 1 is a block diagram of a multi-stage submerged membrane distillation water treatment apparatus according to one embodiment of the present invention.

With reference to FIG. 1, according to one embodiment of the present invention, a multi-stage submerged membrane distillation water treatment apparatus 100 includes a plurality of raw water tanks 101 arranged in multiple stages, a plurality of membrane distillation modules 102 arranged in multiple stages to correspond to the raw water tanks 101, a plurality of heat exchangers 103 arranged in multiple stages to correspond to the raw water tanks 101, a vapor generator 104, a condenser 105, a raw water feeder 106, a turbidimeter 111, a crystallizer 113, and a controller 115.

The raw water tanks 101 are arranged in series and in multiple stages ranging from a first stage to an n-th stage. The raw water tanks 101 store raw water. Raw water can be fed in various ways to the raw water tanks 101. For example, the raw water feeder 106 may feed raw water to all of the raw water tanks 101. Alternatively, the raw water feeder 106 may feed raw water only to the raw water tank 101a at the first stage (foremost stage), which is called a first-stage raw water tank 101a, and the remaining raw water tanks 101b to 101n (i.e. from the second-stage raw water tank 101b to the n-th-stage (last stage) raw water tank 101n) receive raw water respectively from the directly previous stage raw water tanks through raw water pipelines 114.

To this end, every two raw water tanks 101 adjacent to each other is connected to each other via the raw water pipeline 114, so the raw water can be sequentially fed from the first-stage raw water tank 101a to the n-th-stage raw water tank 101n. The raw water also can be fed to the crystallizer 113 from the n-th-stage (i.e. last stage) raw water tank 101n through the raw water pipeline 114, and the raw water discharged from the crystallizer 113 may be selectively returned to the raw water tanks 101a to 101n.

The raw water can be drained to the outside from the n-th-stage (i.e. last stage) raw water tank 101n at predetermined timing. The reason is as follows: during circulation of the raw water from the first-stage raw water tank to the n-th-stage row water tank, a portion of the raw water is changed into vapor for each raw water tank, and thus foreign matter accumulates in the raw water tanks or the concentration of the foreign matter in the raw water tanks gradually increases. For this reason, the raw water is discharged outside to address this problem.

The membrane distillation (MD) modules 102 are also arranged in multiple stages to correspond to the raw water tanks. Specifically, the MD modules 102 are submerged in the raw water in the respective raw water tanks 101. A portion of the raw water supplied to an MD module 102 at a certain stage is changed into vapor and the vapor is supplied to a heat exchanger 103 at the subsequent stage (following stage). This process correspondingly applies to all the MD modules 102 and all the heat exchangers 103.

For example, the vapor generated by the MD module 102a at the first stage (foremost stage) is supplied to the heat exchanger 103b at the second stage subsequent to the first stage, and the vapor generated by the MD module 102b at the second stage is supplied to the heat exchanger 103c at the third stage subsequent to the second stage. In this way, the vapor generated by the MD module 102 at an i-th stage is supplied to the heat exchanger 103 at an i+1-th stage subsequent to the i-th stage.

The vapor discharged from the MD module 102n at the n-th stage (i.e. last stage) is supplied to the condenser 105 and condensed thereby. Since the next stage of the last stage (n-th stage) is not provided with a heat exchanger, the MD module 102n at the last stage discharges the generated vapor to the condenser 105, and the vapor is condensed by the condenser 105. The condensed vapor becomes filtrate and the filtrate is supplied to a filtrate tank 107.

Each MD module 102 is divided into a raw water region and a vapor region by a membrane. When raw water comes into contact with one surface of the membrane, since the surface of the membrane is highly hydrophobic and has high surface tension, the raw water cannot permeate into pores of the membrane. That is, only vapor can pass through the membrane and collects in the vapor region. The vapor becomes fresh water later.

In the MD module 102, there is a temperature difference between the raw water having a relatively low temperature and the vapor having a high temperature divided by the membrane. Due to the temperature difference, the raw water of liquid phase changes into vapor and moves from the raw water side to the filtrate (fresh water) side.

The heat exchangers 103 are also arranged in multiple stages to correspond to the raw water tanks and are submerged in the respective raw water tanks 101. The heat exchangers 103 receive the vapor from the respective previous-stage MD modules 102. At this point, the raw water in each raw water tank 101 is heated through heat exchange with the vapor supplied in this way. Therefore, the raw water in each raw water tank 101 can be maintained at a predetermined temperature.

In this way, according to the present embodiment, the vapor discharged from the MD modules 102 at certain stages is supplied to the heat exchangers 103 at the respective subsequent stages. Therefore, additional heaters for supplying thermal energy needed for heat exchange performed by the heat exchangers 103 at the following stages are not required. Therefore, energy consumption can be reduced. The supply of the vapor from a certain stage to the subsequent stage is sequentially carried out from the first stage (foremost stage) to the n-th stage (last stage).

The vapor generator 104 generates high-temperature vapor and supplies the high-temperature vapor to the heat exchanger 103a at the first stage (foremost stage). That is, since there is no previous-stage MD module to supply vapor to the first-stage heat exchanger 103a, the vapor generator 104 is used to supply high-temperature vapor to the first-stage heat exchanger 103a.

The high-temperature vapor is heat-exchanged with the raw water by the first-stage heat exchanger 103a. The raw water needs to be maintained at a predetermined high temperature in order for the raw water to be easily changed into vapor by the MD module. However, the raw water directly fed from the raw water feeder 106 is relatively cold. For this reason, the temperature of the raw water fed from the raw water feeder 16 to the first-stage raw water tank needs to be increased. That is, the raw water needs to be heat-exchanged with the high-temperature vapor. To enable this heat exchange, the vapor generator 104 functions to supply the high-temperature vapor to the first-stage heat exchanger 103a.

In this case, the vapor generator 104 preferably supplies high-temperature vapor having a temperature higher than that of the raw water in the first-stage raw water tank 101a, to the first-stage heat exchanger 103a. This is because the temperature of the raw water can be increased through heat exchange between the vapor and the raw water in a condition in which the temperature of the vapor is higher than the temperature of the raw water.

Next, after the heat exchange is performed by the first-stage heat exchanger 103a, the vapor is returned to the vapor generator 104. The high-temperature vapor supplied to the first-stage heat exchanger 103a by the vapor generator 104 is discharged as low-temperature vapor after it undergoes the heat exchange with the raw water. This low-temperature vapor is returned to the vapor generator 104 and then heated by the vapor generator 104 to a predetermined temperature. The heated vapor is sent again to the first-stage heat exchanger 103a. In this way, the vapor supplied to the first-stage heat exchanger 103a is managed to be always maintained at a high temperature.

The condenser 105 condenses the vapor supplied by the n-th-stage (i.e. last stage) MD module 102n through heat exchange and discharges the condensed vapor as filtrate to the filtrate tank 107. For this heat exchange, the condenser 105 is supplied with low-temperature raw water by the raw water feeder 106. Thus, the vapor supplied by the n-th-stage MD module 102n to the condenser 105 is heat-exchanged with the low-temperature raw water supplied by the raw water feeder 106. Through this heat exchange, the vapor is condensed and then discharged as filtrate to the filtrate tank 107.

The raw water feeder 106 feeds the low-temperature raw water to the first-stage (i.e. foremost stage) raw water tank 101a via the condenser 105. That is, when the low-temperature raw water is supplied the first-stage raw water tank 101a, since the low-temperature water is supplied via the condenser 105, condensation of vapor can be performed by the condenser 105.

According to the embodiment described above, the raw water feeder 106 feeds raw water to only the first-stage raw water tank 101a. However, according to another embodiment, the raw water feeder 106 can feed raw water to all the raw water tanks 101a to 101n. In that case, the raw water feeder 106 may feed raw water to the raw water tanks 101 using a pump (not shown).

As described above, according to the embodiments of the present invention, the MD modules 102 and the heat exchangers 103, both arranged in multiple stages, are submerged in raw water in the raw water tanks 101 arranged in multiple stages, and raw water and vapor are sequentially and repeatedly moved from one stage to another so that filtrate can be continuously produced.

Specifically, the vapor discharged from the MD modules 102 arranged in multiple stages is not used to produce fresh water but used for heat exchange by the heat exchangers 103 at the respective subsequent stages, and the first-stage heat exchanger performs heat exchange with the high-temperature vapor supplied by the vapor generator 104. Due to this operation process, additional heaters to supply thermal energy needed for heat exchange of the heat exchangers 103 are not necessary. Therefore, energy consumption can be dramatically reduced.

In the present invention, the vapor used for heat exchange by the first-stage heat exchanger 103a is returned to the vapor generator 104, but the vapor used for heat exchange by the remaining heat exchangers (i.e. from the second-stage heat exchanger 102b to the n-th-stage heat exchanger 102n) is supplied to the filtrate tank 107.

That is, the filtrate tank 107 receives and stores the vapor in this way. The filtrate tank 107 also receives and stores the vapor discharged from the n-th-stage MD module 102n. The vapor discharged from the n-th-stage MD module 102n is supplied to the filtrate tank 107 via the condenser 105. When the vapor passes through the condenser 105, the vapor undergoes heat exchange with the low-temperature raw water fed by the raw water feeder 106, thereby being condensed. Afterwards, the condensed vapor is sent to the filtrate tank 107.

The crystallizer 113 receives the raw water discharged from the n-th-stage raw water tank 101n via the raw water pipeline 114 and extracts and separates crystals of specific substances, i.e. valuable resources contained in the raw water. The separated crystals are discharged outside the crystallizer and the raw water from which the crystals of valuable resources are removed is selectively returned to the raw water tanks 101a to 101n.

As shown in the drawings, according to one embodiment of the present invention, the crystallizer 113 includes a housing 1131, a filter 1132, a ultrasonic generator 1133, and a ultrasonic vibrator 1134.

The housing 1131 has an internal space with a predetermined size to store the raw water discharged from the n-th-stage raw water tank 101n.

The filter 1132 is present in plural number and is installed in the housing 1131. The filter 1132 separates the crystals of predetermined valuable resources contained in the raw water by filtering out the crystals of the predetermined valuable resources. The filter 1132 includes a cartridge filter, for example. Since, as described above, a portion of the raw water is vaporized while it circulates through the water treatment apparatus, the amount of the raw water decreases with time. Therefore, the concentration of valuable resources in the raw water increases with time and finally the valuable resources are supersaturated in the raw water, thereby being precipitated as crystals. The filter 1132 filters out the crystals, thereby separating the crystals from the raw water.

That is, the crystals of valuable resources are filtered out by the filter 1132, and only the raw water passes through the filter 1132. The filtered raw water is selectively returned to at least one raw water tank of the raw water tanks 101a to 101n arranged in multiple stages. Here, which raw water tanks are supplied with the filtered raw water is determined preferably in accordance with a concentration of the raw water. For example, it is preferable that the raw water tanks, in which raw water has a concentration equal or similar to that of the raw water filtered by the filter 1132, are supplied with the raw water filtered by the filter 1132. For example, the concentration of the raw water means the level (mg/L) of total dissolved solids (TDS) in the raw water. The raw water discharged from the crystallizer 113 is preferably fed to the raw water tanks storing raw water having a TDS level similar to that of the raw water discharged from the crystallizer 113.

Meanwhile, in the present embodiment, during the process in which the crystals of valuable resources are filtered out by the filter 1132, the crystals are likely to stick to the surface of the filter 1132. For this reason, according to the present invention, the filter 1132 is vibrated so that the crystals of the valuable resources can be easily detached from the surface of the filter 1132. For vibration of the filter 1132, according to the present invention, the ultrasonic generator 1133 generates a predetermined frequency of ultrasonic waves and transmits the ultrasonic waves to the ultrasonic vibrator 1134 attached to a portion of the housing 1131. With the use of the ultrasonic waves generated by the ultrasonic generator 1133, the ultrasonic vibrator 1134 causes the housing 1131 to vibrate.

The vibration of the housing 1131 is transferred to the filter 1132 via the raw water, so the filter 1132 is also vibrated. The crystals of valuable resources attached to the surface of the filter 1132 are detached and removed from the filter 1132 due to the vibration of the filter 1132. Subsequently, the raw water from which valuable resources are removed is selectively returned to the raw water tanks 101a to 101n, and the removed valuable resources are discharged outside the crystallizer.

According to another embodiment of the present invention, the crystallizer 113 may further include a stirrer 1138 installed in the housing 1131. The stirrer rotates the crystals of valuable resources remaining in the housing 1131, thereby increasing the size of the crystals and consequently causing the crystals to be collected at the bottom of the housing 1131 by centrifugal force. For this reason, it is preferable that the housing 1131 has a conical shape.

In addition, the housing 1131 is preferably made of stainless steel so that the vibration of the housing 1131 can be more easily transferred to the filter 1132.

In addition, according to a further embodiment of the present invention, the crystallizer 113 may further include a particle analyzer 1135 that analyzes the particle sizes of the crystals of valuable resources discharged from the housing 1131. In this case, the controller 115 transmits a control signal for adjusting the frequency of ultrasonic waves generated by the ultrasonic generator 1133 in accordance with the particle sizes of the crystals of valuable resources, analyzed by the particle analyzer 1135, to the ultrasonic generator 1133.

This control is performed to generate a higher frequency of ultrasonic waves for valuable resources with a smaller particle size, thereby increasing a recovery rate of valuable resources. In addition, the controller 115 determines timing at which valuable resources are recovered on the basis of the results of the particle size analysis of the particle analyzer 1135, and controls opening of a discharge valve 1136 installed in a lower portion of the housing 1131, thereby recovering valuable resources.

The turbidimeter 111 continuously detects the turbidity of raw water that is fed to the crystallizer 113 from the n-th-stage (i.e. last stage) raw water tank 101n. The turbidity of raw water is used to determine timing at which crystals of valuable resources are formed in the crystallizer 113. That is, when crystals of valuable resources start to form, the turbidity of raw water becomes a predetermined value.

For example, when crystals of highly concentrated salts, i.e. valuable resources, start being formed in the raw water, the raw water becomes turbid. At this point, the turbidimeter 111 detects the predetermined value. That is, detection of the predetermined value by the turbidimeter 111 means that crystals of valuable resources are formed. Therefore, at this point, the crystallizer 113 causes the filter 1132 to vibrate to prevent the crystals of valuable resources from sticking to the filter 1132, thereby enabling the crystals of valuable resources to be easily separated and removed from the raw water.

The controller 115 determines whether the turbidity detected by the turbidimeter 111 is equal to the predetermined value, i.e. reference value, then determines that crystals of valuable resources are formed when the detected turbidity is equal to the reference value, and transmits an operation signal to the ultrasonic generator 1133 of the crystallizer 113. Next, the ultrasonic generator 1133 generates ultrasonic waves and transfers ultrasonic waves to the ultrasonic vibrator 1134, thereby causing vibration of the housing 1131. The vibration of the housing 1131 is transferred to the filter 1132 via the raw water, so the filter 1132 is accordingly vibrated. In consequence, the crystals of valuable resources on the surface of the filter 1132 are detached from the filter 1132.

According to a further embodiment, the controller 115 receives a pressure value detected by a pressure gauge 1137 installed in the housing 1131 and causes the filter 1132 of the crystallizer 113 to be cleaned when the detected pressure value reaches a predetermined critical pressure value.

The cleaning of the filter 1132 is performed to detach the crystals of valuable resources from the surface of the filter 1132. The cleaning is performed by operating the ultrasonic generator 1133 and causing vibration of the filter 1132.

In addition, according to a further embodiment of the present invention, the multi-stage submerged membrane distillation water treatment apparatus 100 may further include a conductivity meter 112. The conductivity meter 112 detects the conductivity of raw water fed to the crystallizer 113 from the n-th-stage raw water tank 101n. In this case, the controller 115 determines that the crystals of valuable resources are formed when the turbidity detected by the turbidimeter 111 and the conductivity detected by the conductivity meter 112 reach respective predetermined reference values, and controls the crystallizer 113 such that the crystals of valuable resources can be removed from the crystallizer 113.

According to this embodiment, it is possible to more precisely determine timing at which the crystals of valuable resources are formed, by using the conductivity of raw water. Therefore, it is possible to more precisely and accurately determine operation timing of the crystallizer 113.

In addition, the multi-stage submerged membrane distillation water treatment apparatus may further include a temperature detector 109 to detect a temperature of the raw water in the first-stage raw water tank 101a, and a vapor temperature controller 110 to control the operation of the vapor generator 104 on the basis of the temperature detected by the temperature detector 109. The multi-stage submerged membrane distillation water treatment apparatus 100 may further include a vacuum pump 115 or a plurality of aerators 108.

The temperature detector 109 detects the temperature of the raw water in the first-stage raw water tank 101a in real time, and transmits the detected temperature to the vapor temperature controller 110. The vapor temperature controller 110 controls the operation of the vapor generator 104 in accordance with the detected temperature such that the temperature of the raw water in the first-stage raw water tank 101a becomes a predetermined reference temperature.

For example, when the temperature of the raw water in the first-stage raw water tank 101a is lower than the reference temperature, the vapor temperature controller 110 controls the vapor generator 104 such that relatively high-temperature vapor is generated by the vapor generator 104. Conversely, when the temperature of the raw water is higher than the reference temperature, the vapor temperature controller 110 controls the vapor generator 104 such that relatively low-temperature vapor is generated by the vapor generator 104. This control is to maintain the raw water in the first-stage raw water tank 101a at the predetermined reference temperature.

The vacuum pump 115 creates a vacuum pressure in the vapor region of the MD module 102. The MD modules 102 may include various types of membranes. For example, in the embodiments of the present invention, the MD module 102 preferably includes a membrane for vacuum membrane distillation but it is not limited thereto. That is, any known type of membrane can be used if the membrane can change raw water into vapor and discharge the vapor.

For example, in order to obtain a vacuum membrane distillation (VMD) module, the vacuum pump 115 is used to create a vacuum pressure in the vapor regions of the MD modules 102 at the respective stages.

According to the embodiments, after the raw water is fed to the raw water tanks 101 at the respective multiple stages, the pressure in the vapor regions of the MD modules 102 is maintained to be lower than vapor pressure by using the vacuum pump 115. The amount and temperature of vapor generated by each MD module 102 are estimated according to Equations 1 to 4, and vapor pressure at each stage can be accordingly adjusted. First, for each MD module 102, a wafer permeation flux Jw that is a water production amount (m³) per unit area (m²) and unit time (hr), and vapor temperature (Tm) can be obtained using Equations 1 through 3.

$$J_w = A_B[P_v(T_m, C_m) - P_0]$$ Equation 1

Wherein, Jw is a water permeation flux, AB is a water permeability coefficient of an MD module, Pv is a vapor pressure, Tm is a temperature of raw water and vapor on the surface of a membrane of an MD module, Cm is a salt concentration on the surface of a membrane of an MD module, and P0 is a vacuum pressure.

$$J_w = k \ln\left(\frac{C_m}{C_b}\right)$$ Equation 2

Wherein, k is a mass transfer coefficient, ln is a natural logarithm, and Cb is a salt concentration of raw water.

$$T_m = \frac{J_w \Delta H_v}{h_w} - T_b$$ Equation 3

Wherein, ΔHv is latent heat of vaporization, hw is a heat transfer coefficient, and Tb is a temperature of raw water.

Here, the vapor pressure of raw water can be calculated according to Equation 4. The production amount and temperature of vapor can be adjusted with adjustment of the vacuum pressure P0.

$$P_v(T_m, C_m) = \frac{\exp\left\{\frac{-5.80 \times 10^3}{T_m} + 1.39 - 4.86 \times 10^{-2} T_m + 4.18 \times 10^{-5} T_m^2 + -1.45 \times 10^{-8} T_m^2 + 6.55 \log(T_m)\right\}}{1 + 0.57257\left(\frac{C_m}{1000 - C_m}\right)}$$ Equation 4

The aerators 108 are submerged in the raw water in the respective raw water tanks 101 and continuously or periodically operated. The aeration is performed to remove contaminants attached to the membranes of the MD modules 102. For example, the aerators 108 remove the contaminants attached to the membranes by generating air bubbles in the raw water.

Figure 2:
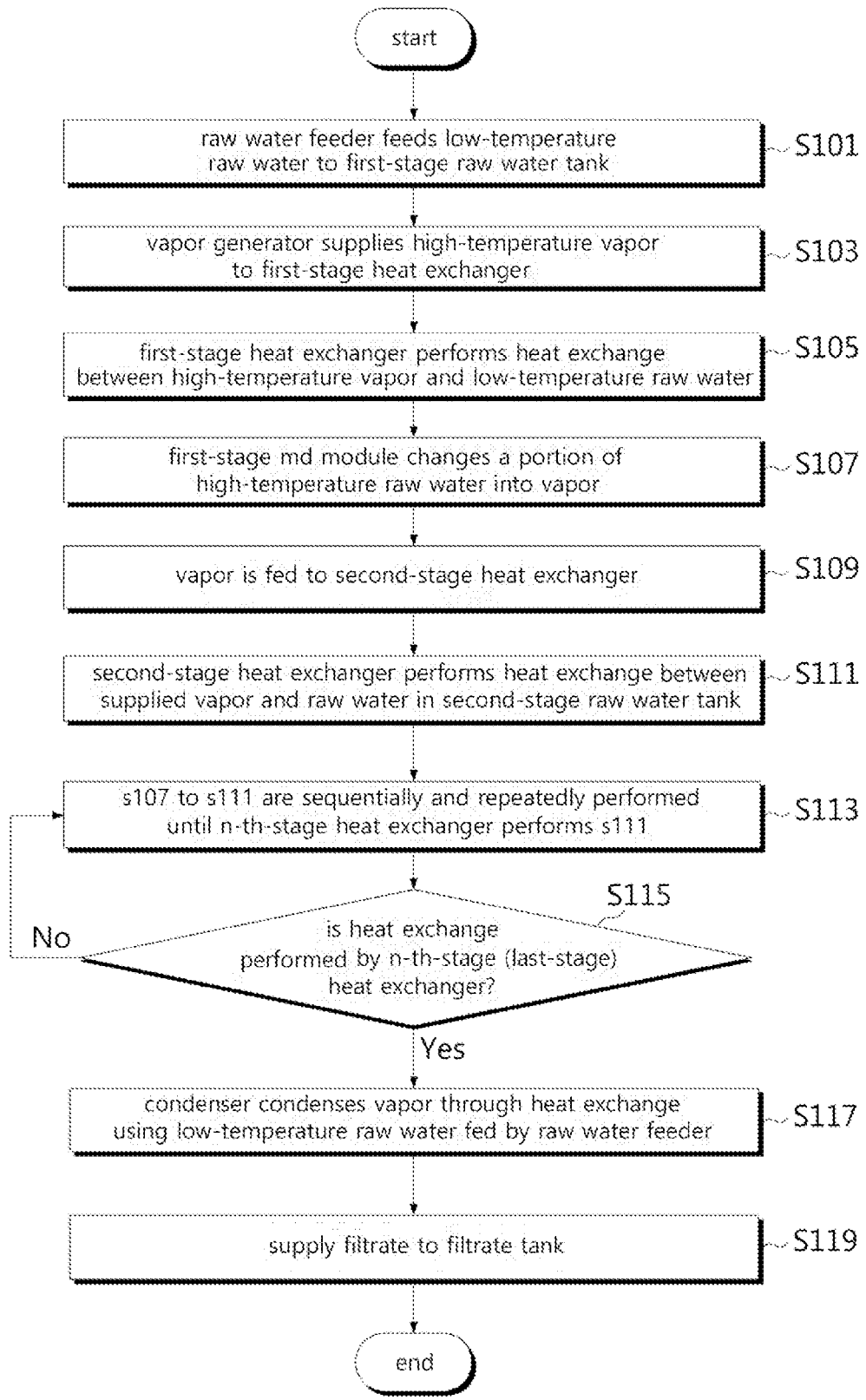
FIG. 2 is a flowchart illustrating a multi-stage submerged membrane distillation water treatment method according to one embodiment of the present invention.

FIG. 2 is a flowchart illustrating a multi-stage submerged membrane distillation water treatment method according to one embodiment of the present invention.

With reference to FIG. 2, the multi-stage submerged membrane distillation water treatment method according to one embodiment of the present invention is implemented in a multi-stage submerged membrane distillation water treatment apparatus having a structure in which raw water is stored in a plurality of raw water tanks 101a to 101n arranged in multiple stages ranging from a first stage to an n-th stage, a plurality of MD modules 102a to 102n is submerged in the respective raw water tanks 101a to 101n, and a plurality of heat exchangers 103a to 103n is submerged in the respective raw water tanks 101a to 101n.

A raw water feeder 106 feeds raw water to the first-stage raw water tank 101a (Step S101), and a vapor generator 104 supplies high-temperature vapor to the first-stage heat exchanger 103a (Step S103). The first-stage heat exchanger 103a performs heat exchange between the supplied high-temperature vapor and low-temperature raw water (Step S105). Through this heat exchange, the raw water in the first-stage raw water tank 101a can be maintained at a predetermined high temperature. The vapor used for heat exchange by the first-stage heat exchanger 103a is returned to the vapor generator 104.

Next, the first-stage (foremost-stage) MD module 102a changes a portion of high-temperature raw water into vapor (Step S107), and supplies the vapor to the subsequent-stage (second-stage) heat exchanger 103b (Step S109). The second-stage heat exchanger 103b performs heat exchange between the supplied vapor and the raw water in the second-stage raw water tank 101b (Step S111). In this way, the temperature of the raw water is increased through heat exchange.

Step S107 through Step S111 are repeatedly performed for the remaining raw water tanks in the order from the second-stage raw water tank to the n-th-stage (i.e. last stage) raw water tank (Step S113). That is, an MD module 102 at a certain stage supplies high-temperature vapor to a heat exchanger 1043 at the subsequent stage, and the heat exchanger 103 at the subsequent stage performs heat exchange between the supplied vapor and the raw water. This process is sequentially performed for each raw water tank in the order from the second stage to the n-th stage, i.e. last stage.

After Step S107 through Step S111 are sequentially and repeatedly performed, that is, when the heat exchange by the n-th-stage (last stage) heat exchanger 103n is finished (Step S115), the vapor discharged from the n-th-stage MD module 102n is supplied to the condenser 105 (Step S117) because there is no stage subsequent to the n-th stage. The condenser 105 condenses the vapor through heat exchange between the vapor discharged from the n-th stage MD module 102n and low-temperature water fed by the raw water feeder 106 (Step S110), and supplies the condensed vapor to a filtrate tank 107 (Step S121). That is, since there is no stage subsequent to the n-th stage (i.e. last stage), the vapor discharged from the n-th-stage MD module 102*n* is supplied to the condenser 105, and the vapor is heat-exchanged with the low-temperature raw water, fed by the raw water feeder 106, in the condenser 105. Through this heat exchange, the vapor is condensed to become filtrate and the filtrate is supplied to the filtrate tank 107.

In addition, although not shown in the drawings, all of the raw water tanks 101*a* to 101*n* at the respective stages can drain the raw water to the outside. That is, when foreign matter accumulates or is highly concentrated in the raw water while the raw water circulates through the raw water tanks, the raw water in the raw water tanks 101*a* to 101*n* is discharged outside.

In addition, a plurality of aerators 108 may be submerged in the respective raw water tanks 101 and may be continuously or periodically operated. Through this aeration, contaminants attached to the MD modules 102 at the respective stages can be removed.

As described above, in the multi-stage submerged membrane distillation water treatment apparatus 100 according to the embodiment of the present invention, raw water circulates through the raw water tanks 101*a* to 101*n* arranged in multiple stages and sequentially undergoes membrane distillation in each raw water tank. Through the membrane distillation, vapor is generated from the raw water and is then changed into fresh water. Through this process, quality fresh water can be produced. In addition, timing at which crystals of valuable resources are formed in the raw water is detected on the basis of a turbidity and a conductivity of the raw water, and the valuable resources are extracted using the crystallizer.

Figure 3:
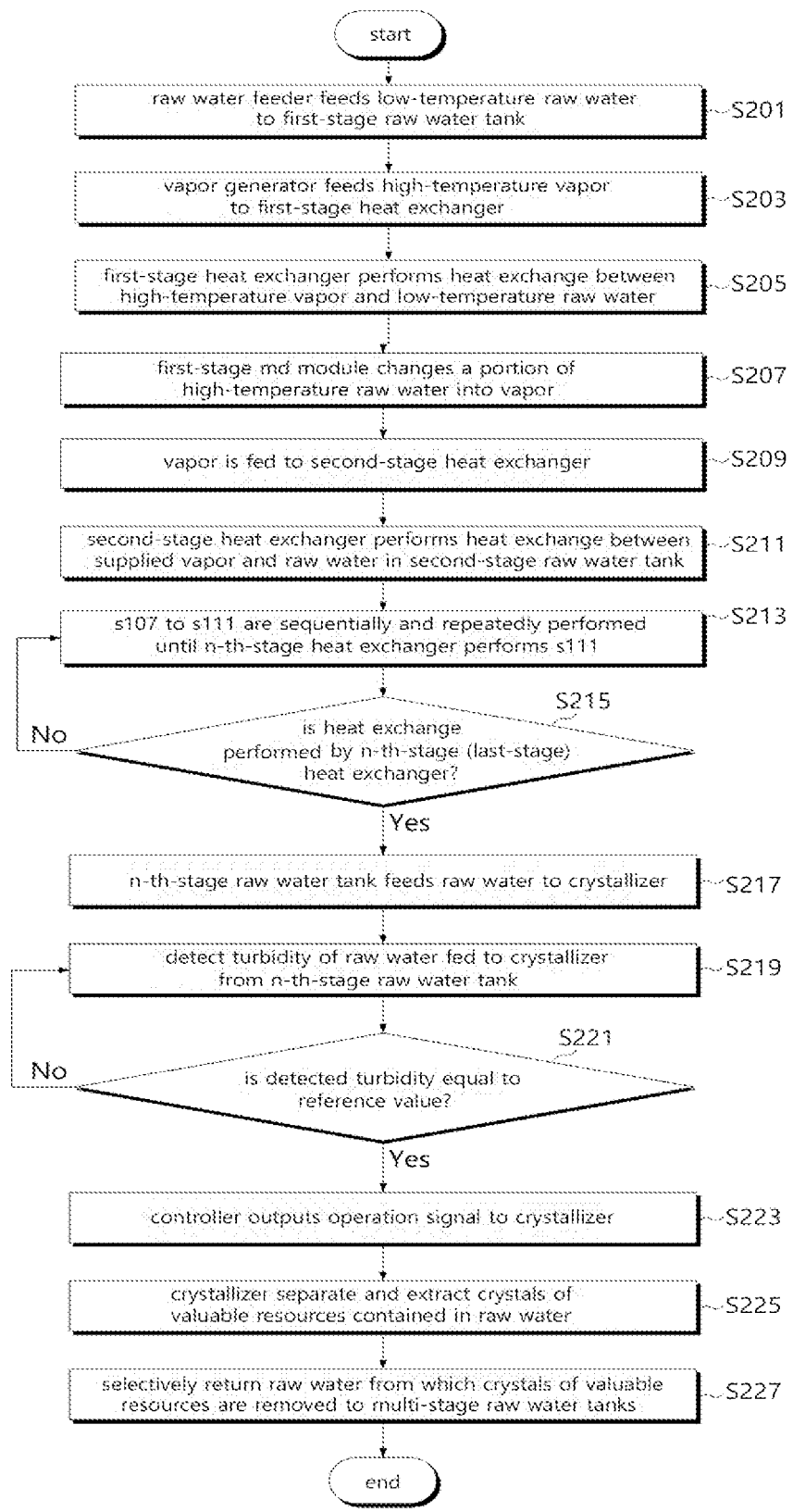
FIG. 3 is a flowchart illustrating a resource recovery method using the multi-stage submerged membrane distillation water treatment apparatus according to the embodiment of the present invention.

FIG. 3 is a flowchart illustrating a resource recovery method using a multi-stage submerged membrane distillation water treatment apparatus according to one embodiment of the present invention.

With reference to FIG. 3, according to the resource recovery method using a multi-stage submerged membrane distillation water treatment apparatus according to one embodiment of the present invention, the raw water feeder 106 feeds low-temperature raw water to the first-stage (i.e. foremost stage) raw water tank 101*a* (Step S201). Next, the vapor generator 104 supplies high-temperature vapor to the first-stage heat exchanger 103*a* (Step S203). The first-stage heat exchanger 103*a* performs heat exchange between the high-temperature vapor and the low-temperature raw water (Step S205). Through this heat exchange, the raw water in the first-stage raw water tank 101*a* can be maintained at a predetermined high temperature. The vapor having undergone the heat exchange in the first-stage heat exchanger 103*a* is returned to the vapor generator 104.

Next, the first-stage MD module 102*a* changes a portion of the high-temperature raw water into vapor (Step S207) and supplies the vapor to the second-stage (i.e. subsequent stage) heat exchanger 103*b* (Step S209). The second-stage heat exchanger 103*b* performs heat exchange between the vapor supplied from the first-stage MD module 102*a* and the raw water in the second-stage raw water tank 101*b* (Step S211). Through this heat exchange, the temperature of the raw water in the second-stage raw water tank is increased.

S207 through S211 are sequentially and repeatedly performed for all of the remaining raw water tanks in the order from the second-stage raw water tank to the n-th-stage (i.e. last stage) raw water tank (Step S213). That is, high-temperature vapor is supplied from an MD module 102 at a certain stage to a heat exchangers 103 at the subsequent stage, and the heat exchanger 103 at the subsequent stage perform heat exchange between the supplied vapor and the raw water. This process is sequentially performed from the second stage to the n-th stage.

When Step S207 through S211 are continuously performed and finally the heat exchange of the n-th stage (i.e. last stage) heat exchanger 103*n* is finished (Step S215), the raw water in the n-th-stage raw water tank 101*n* is supplied to the crystallizer 113 via the raw water pipeline 114 (Step S217). At this point, the turbidimeter 111 detects the turbidity of the raw water supplied to the crystallizer 113 from the n-th-stage raw water tank 101*n* (Step S219).

Next, the controller 115 compares the turbidity of the raw water detected by the turbidimeter 111 with a predetermined reference value (Step S221). When the detected turbidity is equal to the reference value, the controller 115 determines that crystals of valuable resources are formed in the raw water and transmits an operation signal to the crystallizer 113 to recover the crystals of valuable resources generated in the raw water (Step S223).

The crystallizer 113 is operated in response to the operation signal, thereby separating and discharging the crystals of valuable resources contained in the raw water (Step S225). This method determines timing at which valuable resources are concentrated and supersaturated to be precipitated as crystals during circulation of the raw water, through the turbidity detection, and operates the crystallizer 113 to filter out and separate the valuable resources when the results of the turbidity detection show the timing.

Next, the raw water from which valuable resources are removed is returned to the raw water tanks 101*a* to 101*n* at the respective steps (Step S227), and the processes described above are repeated. Since a portion of the raw water is changed into vapor during circulation of the raw water and the amount of the raw water decreases with time, the raw water in the raw water tanks is replenished by the raw water feeder 111 at predetermined times.

In addition, although not shown in the drawings, according to another embodiment, the conductivity of the raw water supplied to the crystallizer 113 from the n-th-stage raw water tank 101*n* may be detected by the conductivity meter 112 after the turbidity is detected. In this case, the controller 115 operates the crystallizer 113 when the detected turbidity and the detected conductivity reach respective reference values to recover crystals of valuable resources.

Figure 4:
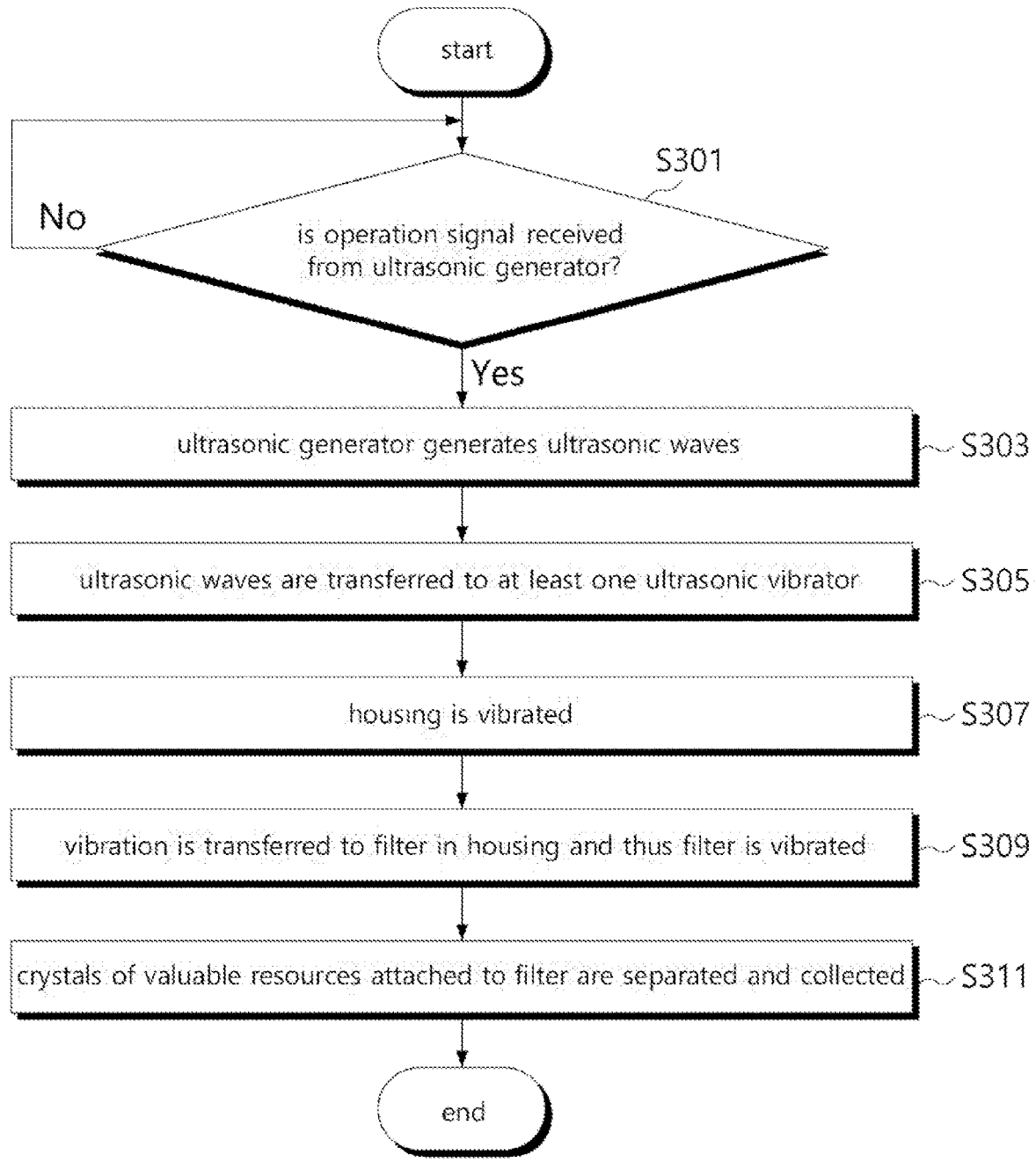
FIG. 4 is a flowchart illustrating the operation of a crystallizer according to one embodiment of the present invention.

FIG. 4 is a flowchart illustrating the operation of the crystallizer according to one embodiment of the present invention.

With reference to FIG. 4, according to one embodiment of the present invention, the crystallizer determines whether it has received an operation signal from the controller 115 (Step S301), and generates a predetermined frequency of ultrasonic waves by operating the ultrasonic generator 1133 when the operation signal is received (Step S303).

The ultrasonic waves are transferred to at least one ultrasonic vibrator 1134 attached to a portion of the housing 1131 of the crystallizer 113 (Step S305), so the housing 1131 is vibrated (Step S307).

The vibration of the housing 1131 is transferred to the filter 1132 in the housing 1131 via the raw water, so the filter 1132 is also vibrated (Step S309). Therefore, the crystals of valuable resources attached to the filter 1132 can be separated from the filter 1132 (Step S311). At this point, the raw water from which the crystals of valuable resources are removed is returned to the raw water tanks 101.

Although not illustrated in the drawings, after the crystals of valuable resources are separated from the filter 1132, the particle sizes of the crystals of valuable resources are analyzed using the particle analyzer 1135. In this case, the controller 115 transmits a control signal for adjusting the frequency of ultrasonic waves generated by the ultrasonic generator 1133 in accordance with the particle size analyzed by the particle analyzer 1135, to the ultrasonic generator 1133.

In addition, the controller 115 determines timing at which the crystals of valuable resources are recovered, in accordance with the analyzed particle size, and recovers the valuable resources by opening and closing the discharge valve 1136. In addition, the controller 115 may operate the crystallizer 113 to perform cleaning of the filter 1132 when a pressure value detected by the pressure gauge 1137, which is configured to detect the internal pressure of the housing 1131, reaches a predetermined critical pressure value.

As described above, in the multi-stage submerged membrane distillation water treatment apparatus and method according to the present invention, vapor discharged by an MD module at a certain stage is supplied to a heat exchanger at the subsequent stage. That is, the vapor at a previous stage is used for heat exchange at the following stage. In addition, a portion of the vapor discharged from the MD module at the last stage is compressed by a vapor compressor to be changed into high-temperature vapor, and the high-temperature vapor is supplied to the heat exchanger at the first stage so as to be used for heat exchange at the first stage. In this way, since the vapor at previous stages is recycled and reused at the following stages, energy consumption can be dramatically reduced compared with conventional apparatuses. Furthermore, since additional heat sources for heat exchange with the raw water are not required, the apparatus of the present invention has advantages of low equipment cost, simple system, and easy maintenance.

In addition, in the resource recovery method using the multi-stage submerged membrane distillation water treatment apparatus according to one embodiment of the present invention, when crystals of valuable resources are formed during circulation of the raw water through the multistage raw water tanks, the crystals of valuable resources are collected through filtering in the crystallizer. Therefore, valuable resources are not discharged but collected. That is, since valuable resources, contained in waste water or sewage and conventionally regarded as waste, are recovered and recycled, resources can be secured. Furthermore, usage of chemicals used for recovery of valuable resources contained in raw water and production of sludge can be reduced.

FIG. 5 is a diagram illustrating an experiment for estimating a total dissolved solids (TDS) level and a recovery rate for each-stage raw water tank according to one embodiment of the present invention.

As described above, the raw water discharged from the crystallizer 113 is returned to some selected raw water tanks of the first to n-th raw water tanks. Preferably, the raw water discharged from the crystallizer 113 is returned to the raw water tanks storing raw water in which a concentration of raw water is equal to or similar to that of the raw water discharged from the crystallizer 113. This process is performed to reuse the raw water discharged from the crystallizer 113 by mixing the raw water discharged from the crystallizer 113 with raw water having a similar or equal concentration. This return process is continued until the concentration of raw water in each raw water tank reaches a predetermined reference value. When the concentration of the raw water in each raw water tank reaches the predetermined reference value, the raw water is drained to the outside.

With reference to FIG. 5, raw water is sequentially supplied in the order from the first-stage raw water tank 101a to the n-th-stage raw water tank 101n through the raw water pipelines 114. In this case, an initial TDS level of raw water fed to the first-stage raw water tank 101a is set to TDS(0). The TDS levels of the raw water in the raw water tanks 101a to 101n after a portion of the raw water is vaporized is respectively set to TDS(1), TDS(2), TDS(3), ..., and TDS(n). When recovery rates for the raw water tanks 101a to 101n are respectively set to Rec(1), Rec(2), Rec(3), ..., and Rec(n), the TDS levels for the raw water tanks 101a to 101n are calculated according to Equation 5.

$$TDS(n)=TDS(n-1)\times(1/(1-Rec(n)/100))\times(1-Rec(n)/100)+TDS(n-1)\times(Rec(n)/100) \qquad \text{Equation 5}$$

Wherein, the recovery rate Rec at one stage is calculated as "(a water production amount of a raw water tank/an amount of raw water fed the raw water tank)×100". That is, the recovery rate for a certain stage can be adjusted with change in the water production amount of the stage. Specifically, the production amount can be calculated by multiplying the water permeation flux, calculated by Equations 1 through 4, by an area of a membrane of an MD module submerged in raw water at the stage. In this calculation, since the amount of raw water fed to a raw water tank is a preset value, the recovery rate can be decided according to the water production amount.

Table 1 shows TDS levels of raw water in 7 raw water tanks and total recovery rates obtained through an exemplary experiment of the present invention.

TABLE 1

| Raw water tank No. | Inflow TDS | Recovery rate (Rec) | Concentration coefficient | TDS after concentration | TDS in raw water tank | Total recovery rate |
|---|---|---|---|---|---|---|
| 1 | 35,000 | 20% | 1.25 | 43,750 | 42,000 | 20.0% |
| 2 | 42,000 | 20% | 1.25 | 52,500 | 54,400 | 36.0% |
| 3 | 50,400 | 20% | 1.25 | 63,000 | 60,480 | 48.8% |
| 4 | 60,480 | 20% | 1.25 | 75,600 | 72,576 | 59.0% |
| 5 | 72,576 | 20% | 1.25 | 90,720 | 87,091 | 67.2% |
| 6 | 87,091 | 20% | 1.25 | 108,864 | 104,509 | 73.8% |
| 7 | 104,509 | 20% | 1.25 | 130,636 | 125,411 | 79.0% |

The TDS level of raw water in each raw water tank is estimated through this process, and compared with the TDS level of the raw water discharged from the crystallizer 113. Thus, the raw water discharged from the crystallizer 113 is returned to the raw water tanks storing raw water having a TDS level most similar to that of the raw water discharged from the crystallizer 113.

Although hereinabove a description has been made such that all elements are combined in one embodiment or operated in combination, the present invention is not limited to such a configuration. That is, only some elements of all the elements can be selectively combined or can be operated in combination within the scope of the objects of the present invention. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although a preferred embodiment of the present invention has been described for illustrative purposes, those skilled in the art will appreciate that various modifications, additions and substitutions are possible, without departing from the substantial nature of the invention. Accordingly, exemplary embodiments disclosed herein have not been described for limiting the technical spirit of the present invention but be described only for illustrative purposes. Therefore, the technical spirit of the present invention will not be limited to the exemplary embodiments. The specific protection scope of the present invention should be construed as defined by the accompanying claims, and all technical spirits equivalent thereto should be construed to be within the protection scope of the present invention.

What is claimed is:

1. A resource recovery method using a membrane distillation water treatment apparatus including: a plurality of membrane distillation (MD) modules arranged in multiple stages ranging from a first stage to an n-th stage and submerged in raw water in respective raw water tanks arranged in multiple stages ranging from the first stage to the n-th stage, the MD modules discharging a portion of the raw water as vapor; and a plurality of heat exchangers arranged in multiple stages ranging from the first stage to the n-th stage, each heat exchanger performing heat exchange using the vapor supplied from a previous-stage MD module of the MD modules, thereby maintaining the raw water in each raw water tank at a predetermined temperature, the method comprising:
    a first step at which a raw water feeder feeds raw water to the first-stage raw water tank;
    a second step at which a vapor generator supplies high-temperature vapor to the first-stage heat exchanger;
    a third step at which the first stage heat exchanger performs heat exchange between the supplied high-temperature vapor and the raw water in the first-stage raw water tank, and the first-stage MD module changes a portion of the water into vapor and supplying the changed vapor to a subsequent-stage heat exchanger (second-stage heat exchanger);
    a fourth step of repeatedly performing the third step for each of the raw water tanks sequentially in the order from the second state to the n-th stage;
    a fifth step at which the raw water is feed to a crystallizer from the n-th stage raw water tank;
    a sixth step at which a turbidimeter detects a turbidity of the raw water fed to the crystallizer from the n-th-stage raw water tank;
    a seventh step at which a controller transits an operation signal to the crystallizer when the turbidity of the raw water detected by the turbidimeter becomes a predetermined reference value; and
    an eighth step at which the crystallizer operated by the operation signal extracts crystals of valuable resources contained in the raw water fed to the crystallizer from the n-th-stage raw water tank.

2. The resource recovery method according to 1, wherein the eighth step comprises:
    a first sub-step at which a ultrasonic vibrator generates a predetermined frequency of ultrasonic waves in response to the operation signal transmitted from the controller;
    a second sub-step at which a ultrasonic vibrator attached to a portion of a housing storing raw water supplied from the n-th-stage raw water tank, vibrates the housing using the ultrasonic waves generated by the ultrasonic generator; and
    a third sub-step at which a filter installed in the housing is vibrated by vibration of the housing such that crystals of valuable resources, attached to the filter, are separated from the filter.

3. The resource recovery method according to claim 2, wherein after the third sub-step is performed, the following steps are further performed:
    analyzing particle sizes of the crystals of valuable resources filtered out by the filter using a particle analyzer; and
    transmitting a control signal for adjusting the frequency of ultrasonic waves generated by the ultrasonic generator in accordance with the particle sizes of the crystals of valuable resources analyzed by the particle analyzer, to the ultrasonic generator.

4. The resource recovery method according to claim 1, wherein after the first step, the following steps are further performed:
    detecting a temperature of the raw water in the first-stage raw water tank, using a temperature detector; and
    controlling a temperature of vapor generated by a vapor generator on the basis of the detected temperature of the raw water.

5. The resource recovery method according to claim 1, wherein after the sixth step, the following steps are performed:
    detecting a conductivity of raw water fed to the crystallizer from the n-th-stage raw water tank, using a conductivity meter; and
    transmitting an operation signal to the crystallizer by the controller when the detected turbidity and the detected conductivity reach respective reference values.

* * * * *